UNITED STATES PATENT OFFICE.

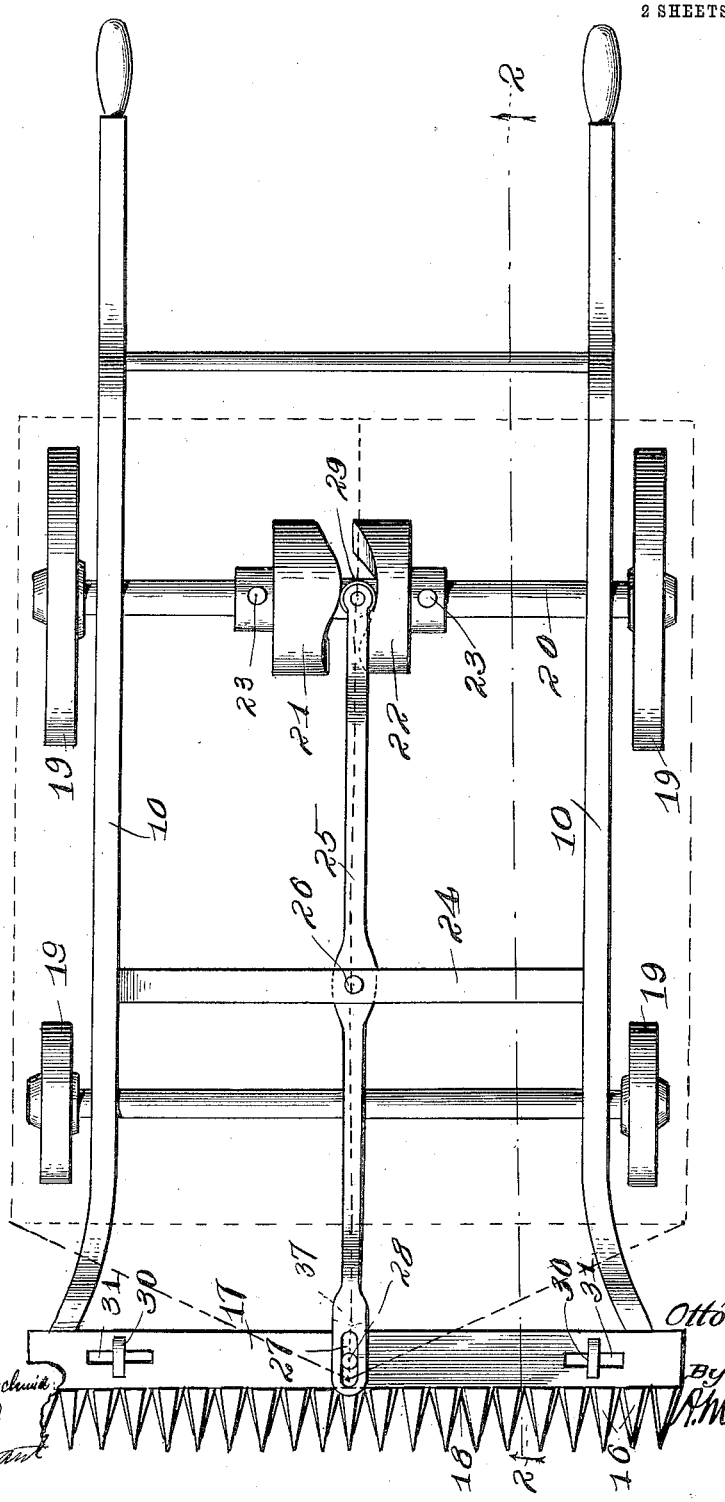

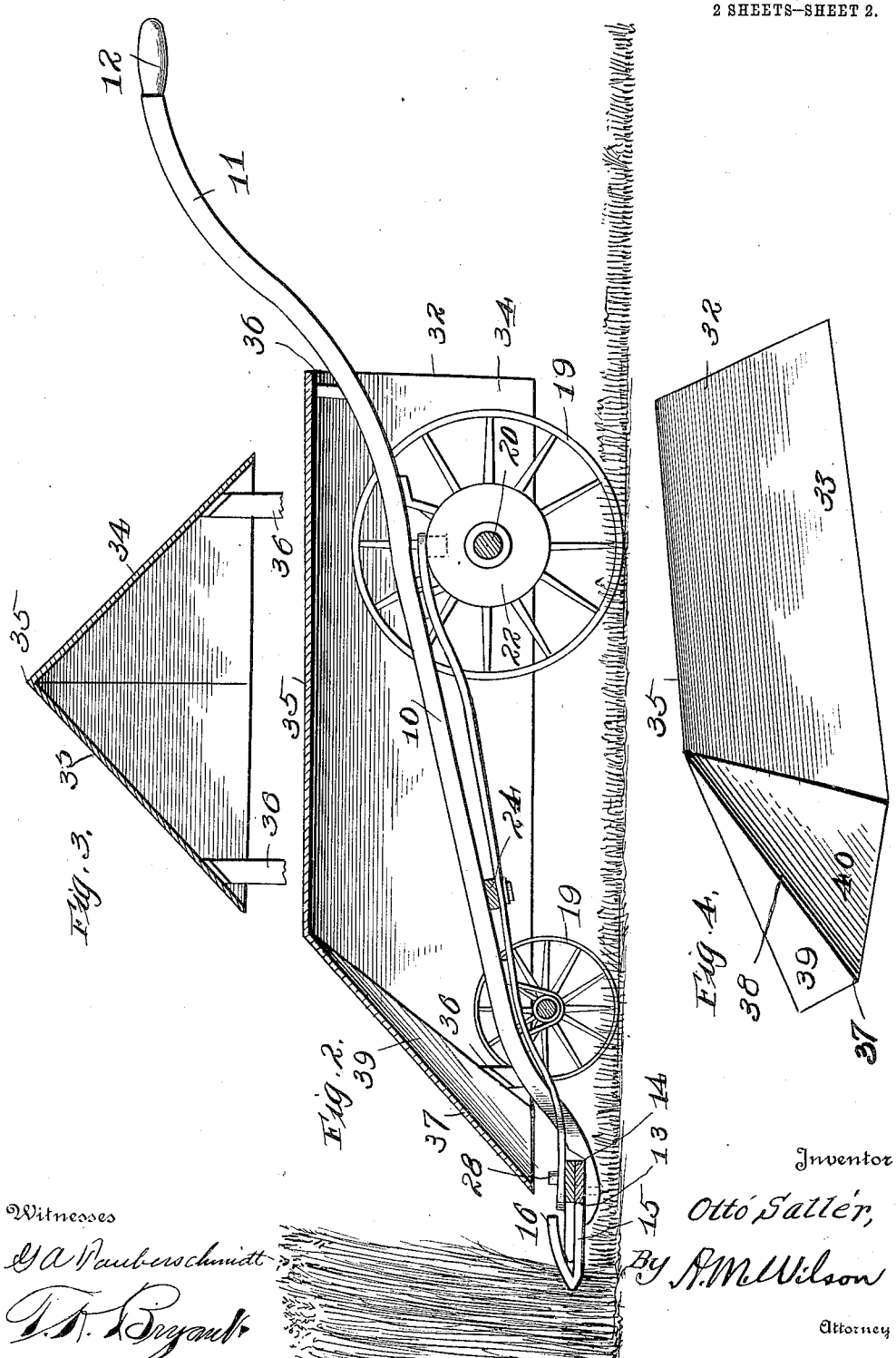

OTTÓ SALLÉR, OF DERBY, CONNECTICUT.

MOWING-MACHINE.

1,101,758.

Specification of Letters Patent. Patented June 30, 1914.

Application filed January 30, 1914. Serial No. 815,457.

*To all whom it may concern:*

Be it known that I, OTTÓ SALLÉR, a subject of the King of Hungary, residing at Derby, in the county of New Haven and State of Connecticut, have invented certain new and useful Improvements in Mowing-Machines, of which the following is a specification.

This invention relates to certain new and useful improvements in mowing machines and relates more especially to that class of such devices known as central cut mowers.

An object of the present device is the provision of a mower in which the cutting operation is performed through a cam actuated cutter bar impelled by the traction wheels of a mower.

A further object is to provide such a mower which will cut the wheat, grain, grass or the like in the direct line of travel of the mower and which during its operative movement affords a means whereby the cut grain is equally separated and spread upon the ground at each opposite side of the mower.

While the present invention is now illustrated in connection with a mower especially adapted to be pushed forward manually by the operator in the cutting of wheat and grain, it is obvious that the invention also contemplates its employment with animal and motor propelled mowers for the cutting of all kinds of growing vegetation.

With these general objects in view and others that will appear as the nature of the invention is better understood, the same consists in the novel combination and arrangement of parts hereinafter fully described, illustrated in the accompanying drawings and pointed out in the appended claim.

In the drawings forming a part of this application and in which like designating characters refer to corresponding parts throughout the several views:—Figure 1 is a plan view of the device with the separating cover shown in dotted lines. Fig. 2 is a vertical longitudinal sectional view taken upon line 2—2 of Fig. 1. Fig. 3 is a vertical transverse sectional view of the mower cover and by which the cut grain is separated, and Fig. 4 is a perspective view of said cover detached from the mower.

Referring more in detail to the drawings, it will be noted that the frame of the mower consists of two side bars 10 having upwardly curved rear extensions 11 terminating in handles 12 for grasping by the operator in pushing the mower forward in the cutting operation. The forward ends of the side bars 10 are provided with horizontal seats 13 across which is mounted and secured the stationary guard bar 14 provided with a plurality of teeth 15 each having its individual guard 16 of the usual construction found in mowing machines. A cutter bar 17 of the same length as the guard bar is flatly positioned upon the latter for longitudinal reciprocation being provided with forwardly extending knives 18 coöperating for cutting with the teeth 15 at each relative movement of the bars.

The mower frame is preferably mounted upon four wheels 19, the rear pair of which are rigid with the rear axle 20. Complemental cam blocks 21 and 22 spaced apart with their adjacent faces in parallelism are rigidly secured to turn with said rear axle by means of set screws 23. A cross bar 24 connecting the frame bars 10 at a point intermediate of the front and rear axle is provided with a longitudinally extending lever 25 pivoted thereto midway of its length by the bolt 26. Said lever has its forward end provided with a slot 27 engaging over a pin 28 upwardly extending from the cutter bar 17. The rear end of the said lever 25 is provided with a roller 29 mounted on the under surface thereof and positioned to engage within the opening or slot between the cam blocks 21 and 22.

It is desirable that the guard bar 14 be provided with upwardly extending headed studs 30 which are received by slots 31 formed through the cutter bar 17. The cutting operation will be apparent from the above description, it being noted that a pushing of the mower forward by means of the handles 12 causes the rear traction wheels 19 to turn, thus revolving the axle 20 and the cam blocks, which latter causes the lever 25 to be laterally reciprocated to impart through its forward end a longitudinal movement to the cutter bar 17 thereby insuring the cutting of the grain by the knives continuously of the forward progress of the mower.

A combined cover and grain dividing device 32 is provided constructed of the form shown in Fig. 4 being broadly of a gable roof formation with the sides 33 and 34 joined at the ridge 35, the cover structure being mounted upon the side bars 10 by means of suitable brackets 36. This over entirely incloses the top portions of all of the mower wheels thereby preventing the wheels as well as the operating mechanism from being affected or clogged by the cut grain. The said cover is provided with a forward pointed portion 37 having a central oblique rib 38 in alinement with the cover ridge 35 with rearwardly sloping sections 39 and 40, whereby the grain upon being cut falls against the pointed forward portion of the cover after the manner of a locomotive cow-catcher, thus parting and separating the grain in equal proportions and throwing the grain to opposite sides of the mower to lie in wind-rows formed by each passing of the mower.

While the forms of the invention herein shown and described are what are believed to be preferable embodiments thereof, it is nevertheless to be understood that minor changes may be made in form, proportion or details of construction without departing from the spirit and scope of the invention as set forth in the appended claim.

Having thus described my invention and in what manner the same is designed for use, what I claim as new and desire to secure by Letters Patent of the United States is:—

A mower comprising a frame, traction wheels upon said frame, cutting means forwardly positioned upon said frame, an inverted V-shaped cover having a longitudinal top ridge and mounted upon said frame over and covering a portion of all of said wheels and having an open rear end, a V-shaped front portion upon said cover comprising rearwardly sloping side portions, an oblique ridge at the merging of said side portions positioned in the plane of the longitudinal axis of the cover and angularly extending from the forward termination of said top rib.

In testimony whereof I affix my signature in presence of two witnesses.

OTTO SALLÉR.

Witnesses:
 CHARLES E. SUSADICK,
 LEWIS SUSADICK.

Copies of this patent may be obtained for five cents each, by addressing the "Commissioner of Patents, Washington, D. C."